United States Patent
Claudio et al.

[11] Patent Number: 6,035,220
[45] Date of Patent: Mar. 7, 2000

[54] METHOD OF DETERMINING END-OF-DIALING FOR CELLULAR INTERFACE COUPLING A STANDARD TELEPHONE TO THE CELLULAR NETWORK

[75] Inventors: George Claudio, Chicago, Ill.; Daniel Giacopelli, Deer Park, N.Y.; Jeffry Hickey, Patchogue, N.Y.; Fred Engelking, Northport, N.Y.; Paul William Douglas, Centereach, N.Y.

[73] Assignee: Telular Corp., Vernon Hills, Ill.

[21] Appl. No.: 09/054,050

[22] Filed: Apr. 1, 1998

[51] Int. Cl.[7] .................................................. H04Q 7/20
[52] U.S. Cl. .......................... 455/564; 455/403; 455/554; 379/355
[58] Field of Search .......................... 455/74.1, 90, 403, 455/422, 550, 554, 556, 557, 560, 561, 564, 565, 575; 379/88.02, 200, 355, 356, 357

[56] References Cited

U.S. PATENT DOCUMENTS

| | | | |
|---|---|---|---|
| 4,375,103 | 2/1983 | Arneth et al. | 375/109 |
| 4,658,096 | 4/1987 | West, Jr. et al. | 379/59 |
| 4,737,975 | 4/1988 | Shafer | 379/58 |
| 4,775,997 | 10/1988 | West et al. | 379/58 |
| 4,890,315 | 12/1989 | Bendixen et al. | 455/554 |
| 5,267,308 | 11/1993 | Jokinen et al. | 379/354 |
| 5,365,570 | 11/1994 | Boubelik | 379/59 |
| 5,485,513 | 1/1996 | Goedken et al. | 379/355 |
| 5,535,260 | 7/1996 | Zicker et al. | 379/63 |
| 5,561,705 | 10/1996 | Allard et al. | 379/58 |
| 5,568,546 | 10/1996 | Marutiak | 379/355 |
| 5,590,189 | 12/1996 | Turnbull et al. | 379/356 |
| 5,600,655 | 2/1997 | Ishianbe | 370/524 |
| 5,606,598 | 2/1997 | Newland | 379/61 |
| 5,677,950 | 10/1997 | Brendzel | 379/355 |
| 5,722,088 | 2/1998 | Storn et al. | 455/564 |

OTHER PUBLICATIONS

"NOKIA Premicell Operator's Guide", pp. 7, Dec. 17, 1997.

*Primary Examiner*—William G. Trost
*Assistant Examiner*—Nay Maung
*Attorney, Agent, or Firm*—Hamman & Benn

[57] ABSTRACT

A method of determining the end-of-dialing of a currently-dialed telephone number entered into a land-type POTS telephone coupled to a cellular transceiver via a cellular interface unit. The software of the invention will automatically generate a SEND signal upon the matching of a presently-dialed telephone number with a previously-dialed telephone number stored in the memory of the cellular interface unit that has been dialed on the telephone of the system a preset number of times, such as two. The software of the invention stores the list of previously-dialed telephone numbers by numerical order by time-ordering, or random storage of numbers, and continually updates the list for each new dialed telephone number. The software of the invention will allow one of the prior-art, end-of-dialing methods to determine the generation of a SEND signal for those presently-dialed telephone numbers that are not matched with a stored, previously-dialed telephone number.

28 Claims, 3 Drawing Sheets

METHOD OF DETERMINING END-OF-DIALING FOR CELLULAR INTERFACE COUPLING A STANDARD TELEPHONE TO THE CELLULAR NETWORK

BACKGROUND OF THE INVENTION

The present invention is directed to software and method of determining the end-of-dialing of a telephone number made on a standard, land-type telephone coupled to a cellular network via a cellular interface apparatus. Cellular interfaces that couple a standard, land-type telephone, such as a POTS (Plain Old Telephone System) phone or facsimile machine, and the like, to a cellular network are disclosed in commonly-owned U.S. Pat. Nos. 4,658,096, and 4,737,975, which patents are incorporated by reference herein. The prior-art cellular interface systems determine when the last digit of a telephone number has been dialed, or entered, based on three methods: Digit count, time-out, and manual send. In the digit-count method, the apparatus automatically counts the number of digits dialed, and upon reaching a preset limit, will trigger an automatic SEND signal to send the telephone number to the transceiver for completing the call over the cellular system. This method also relies upon digit recognition, such that, if the digit 1 is dialed first, the apparatus will know to wait for the input of eleven digits before triggering the automatic SEND signal. The problem with this method is that the count of digits for which the automatic SEND signal is triggered will typically vary from one country to another, and requires relatively sophisticated software.

The second method, time-out, relies upon a preset lull after the dialing of a digit, and if that preset lull has been reached, it is automatically assumed that the last digit of the telephone number has been entered, and the automatic SEND signal is then generated. This method suffers from the drawback that the generation of the SEND signal is relatively much longer after the entry of the last digit as compared switch the first, digit-count method. The lull time-out may run from two seconds up to twenty seconds. The programmable timer of this method is circuitry which has user or factory-adjustable parameters. The time-period is factory set to a value, nominally 3 seconds, and is stored in the radio EEPROM. Depending on customer requirements, it can be set over a wide range of delays (typical values have been from 2 to 10 seconds). If the value is set too long, the customer may wonder why the phone is waiting; if it is set too short, the phone will mis-dial with an incomplete number, if the customer pauses too long.

The third, manual method relies upon the user of the telephone to press a predetermined "SEND" button on the telephone, such as the pound key or star key, or the like, after having entered the last digit of the telephone number, in order to activate the SEND signal. An alternative version of this is the use of a hook flash which will cause immediate generation of a SEND command. The timing of a hook flash is elusive to many people. If it is too quick, it is not recognized by the system; if it is too long, the telephone will hang up.

According to the present invention, a new method is used, in conjunction with one or more of the three prior-art methods outlined above, for accelerating the generation of the automatic SEND signal for those telephone numbers that have been previously dialed on the telephone.

SUMMARY OF THE INVENTION

It is the primary objective of the present invention to provide a method for use with a cellular interface that couples a standard, land-type telephone, such as a POTS phone or facsimile machine, or the like, to a cellular network that will automatically generate a SEND signal upon the matching of the dialed telephone number with a previously-dialed telephone number stored in the memory of the cellular interface unit.

It is a primary objective of the present invention to compare the dialed telephone number to the list of previously-dialed, stored telephone numbers by storing the previously-dialed telephone numbers by numerical order, by time-ordering or other technique.

It is another objective of the present invention to automatically allow one of the prior-art, end-of-dialing methods to determine the generation of a SEND signal for those dialed telephone numbers that are not matched with a stored, previously-dialed telephone number.

It is another objective of the present invention to store a previously-dialed telephone number, for matching to a presently-dialed telephone number, allowing it to be automically sent to the transceiver after it has been previously dialed at least one or more times.

Toward these and other ends, the method of the present invention consists of software stored in the memory of a cellular interface unit that couples a standard, land-type telephone, such as a POTS phone or facsimile machine, to a cellular network. The software of the invention will automatically generate a SEND signal to the transceiver upon the matching of a presently-dialed telephone number with a previously-dialed telephone number stored in the memory of the cellular interface unit. The software of the invention stores the list of previously-dialed telephone numbers by numerical order, by time-ordering, or random storage of numbers, and continually updates the list for each new dialed telephone number that is dialed on the telephone of the system. The software of the invention will allow one of the prior-art, end-of-dialing methods to determine the generation of a SEND signal for those presently-dialed telephone numbers that are not matched with a stored, previously-dialed telephone number a preset number of times, such as two.

BRIEF DESCRIPTION OF THE DRAWINGS

The invention will be more readily understood with reference to the accompanying drawing, wherein.

DETAILED DESCRIPTION OF THE INVENTION

The present invention consists of software stored in the memory of a cellular interface that couples a standard, land-type telephone, such as a POTS phone or facsimile machine, to a cellular network. The software of the invention is based on an algorithm which will provide, without user-intervention, rapid comparison of the number currently being dialed to a set of numbers previously dialed and stored in memory. When the algorithm determines that the currently-dialed number matches a previously-dialed number that had a high probability of call completion, a SEND command will be issued. This algorithm distinguishes between confusingly similar numbers. The purpose of the algorithm is to recognize the end of dialing of a telephone number currently being dialed, and it is not used to complete the dialing of a number, such as partially-entered number, nor is to serve as a "speed-dial" table. The software of the invention utilizes the algorithm for matching the entire, currently-dialed telephone number to the list, or table, of stored, successfully-completed, previously-dialed, telephone numbers. If the currently-dialed telephone number has no match in the table, then one of the prior-art methods of determining the end-of-dialing is utilized for generating the SEND command for transmitting the currently-dialed telephone number to the transceiver.

In order to determine if a telephone number is to be stored as a successfully-completed, previously-dialed, telephone number, certain preconditional criteria must be utilized. According to the invention, all number sequences acceptable to the telephone storage system of the invention are non-redundant, i.e., no number can appear as a leading subset of another number. For example, if "234 5678" is a valid telephone number for storage in the table, then "234 567 8901" cannot be a valid telephone number, since the software of the invention will never be able to get beyond the first seven digits. (This is why dialing "1" for long distance was added in the PSTN.) Therefore, "1 234 567 8901" is a valid and non-redundant telephone number, and may be stored in the table according to the present invention. Thus, there is no need to differentiate international from local telephone numbers, since all numbers are nonredundant sequences. Tne exception to this rule is the digit "0", which may be used alone to dial the operator, or may precede a longer string of digits; the system of the invention requires a minimum number of digits, thus preventing recognition of a single "0" as a valid number.

The method of the present invention may be turned off or on by the user via entry of a specific key sequence. When off, the status of all stored numbers is retained, and no new numbers are entered.

A list of N successfully-completed, previously-dialed, telephone numbers will be stored in memory, where N may be set to any number depending on the amount of memory available and the speed of the processor. Because storage is finite, an indication of the "age" of the telephone number (number of other numbers dialed since the current telephone number was last dialed) is necessary, in order to indicate which telephone number is oldest and should be deleted when space must be cleared in order to add a new telephone number.

The storage of the telephone-number table will be preferably in NVRAM (non-volatile RAM), but is not critical. However, usually, RAM will be more readily available than NVRAM, and may be used for storage. Loss of power will delete the list of memorized numbers. A manual reset, that effectively empties the stored list of telephone numbers, may also be provided. Since the length of telephone numbers varies across the world, and since there are no limitations on where a phone may be used, no scheme to count digits is implemented, other than an optional requirement of a factory-programmable, minimum number of dialed digits, in order to help prevent invalid-number memorization. Each telephone number is to be stored in the list, or table, only once. A count of the number of times the telephone number has been successfully dialed (up to a maximum, or MIN-HITS) will be included in the list or table. Declaration of end-of-dialing (EOD) via the method of the present invention is not valid until the number of times dialed count equals a minimum amount or MIN-HITS, where MIN-HITS will be at least 2, and where each time the telephone number was dialed ended in a successful transmission. This restraint, where the number of times dialed count must be equal or greater than MIN-HITS, will prevent an incomplete telephone number from being falsely acquired and stored in the table, which otherwise could occur, for example, if, by waiting too long between dialed digits, the time out EOD method would kick in; thus, because the software of the invention could never get past the falsely shortened number once it has been acquired into memory, the use of T equal to or greater than 2 will solve this problem, in addition to the previously-mentioned requirement of a factory-programmable, minimum number of dialed digits. This is necessary, since a falsely-shortened telephone number can violate the assumption that numbers are nonredundant.

If it is possible to determine from the telephone that a voice/traffic channel is assigned, a new number may be further qualified. The new number will only be stored if a voice/traffic channel is assigned by the network for a predetermined amount of time (15 seconds or so). If a number is explicitly rejected by the network, and only control messages are exchanged, the number will be declared invalid and not enter the table. If the particular type of phone is unable to communicate this information to the processor on which the algorithm runs, this qualifier cannot be implemented.

Each number stored in the table-memory will be followed by an automatically-appended character, for example, "#", that flags the end of the number.

As mentioned above, numbers may be stored randomly, in number-sorted form, or time-ordered form. The preferred form of the invention is random-storage. In the case of random or number-ordered storage, another field is required, which additional field is a "tag" to indicate "age" information, so that the oldest, stored telephone number may be eventually discarded as a new one is added. In the time-ordered method, the oldest telephone number will fall off, or be deleted, when the end of the memory capacity has been reached and a new telephone number is to be acquired. Under the time-ordering method, when the dialed telephone number has been recognized as a previously-stored number, the old instance of that previously-stored telephone number must be removed, with that same telephone number now being stored at the head of the list.

In the preferred embodiment, the memory of the cellular interface unit, is used as follows. RAM locations are used to store the incoming, currently-dialed, telephone number sequence. RAM locations are used to store the table or list of previously-dialed telephone numbers. The number of times (T) the telephone number must be dialed before being declared valid for entry into the table, where it is available to indicate EOD, is hard-coded with the software program code. RAM location or register is, also, used to store the count of the digits being currently dialed (digit index). In addition, each stored-number location of the table of stored, previously dialed, telephone numbers in RAM includes space for a telephone number up to, preferably, 16 digits, the number of times that number has been previously dialed, an age indicator, and a flag indicating a match up to the current digit with the number being dialed.

Figure 1:
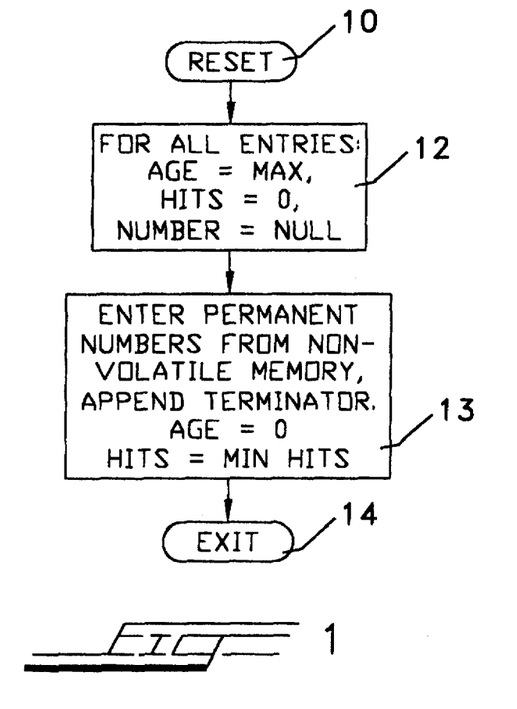
FIG. 1 is a flow chart showing the initialization from system reset of the matching process of a presently-dialed telephone number with a stored list of the previously-dialed telephone numbers.

Referring for now to FIGS. 1–4, there are shown the flow charts for the preferred form of the invention, where the list of stored, previously-dialed telephone numbers is stored in random fashion. FIG. 1 shows the reset process 10. All of the telephone number entries are set such that their age-indication is at a maximum, with the number of hits at zero, and the dialed telephone number at null, whereby there are no stored telephone numbers stored in the memory-table (block 12). At this point, the system has yet to be used for the first time, or the system has been reset by cutting of power to the system, or by resetting it via a key-sequence input. The "reset" subroutine then exits (block 14).

Figure 2:
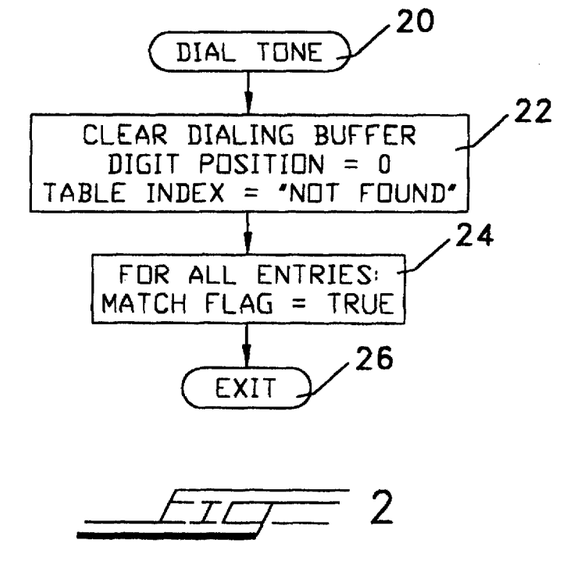
FIG. 2 is a flow chart showing the initialization for the start of a new dialing sequence for matching a presently-dialed telephone number with a stored list of the previously-dialed telephone numbers.

FIG. 2 shows initialization process 20 that occurs before each telephone number is dialed when a dial tone starts (off-hook condition). After dial-tone generation by the cellular-interface unit that couples a standard, land-type telephone, such as a POTS phone or facsimile machine, and the like, to a cellular network, such as that disclosed in U.S. Pat. Nos. 4,658,096, and 4,737,975, the software of the invention clears the dialing buffer, sets the digit position count to zero, and sets the "Table Index" to "Not Found" (block 22). To ensure that all of the previously dialed telephone numbers stored in the tablememory are searched and compared to the currently-dialed telephone number, each entry in the table has its match-flag set to "true" (block 24), upon which ii the dial-tone subroutine exits (block 26), and the software of the invention awaits the entry of the digits of a telephone being dialed.

Figure 3:
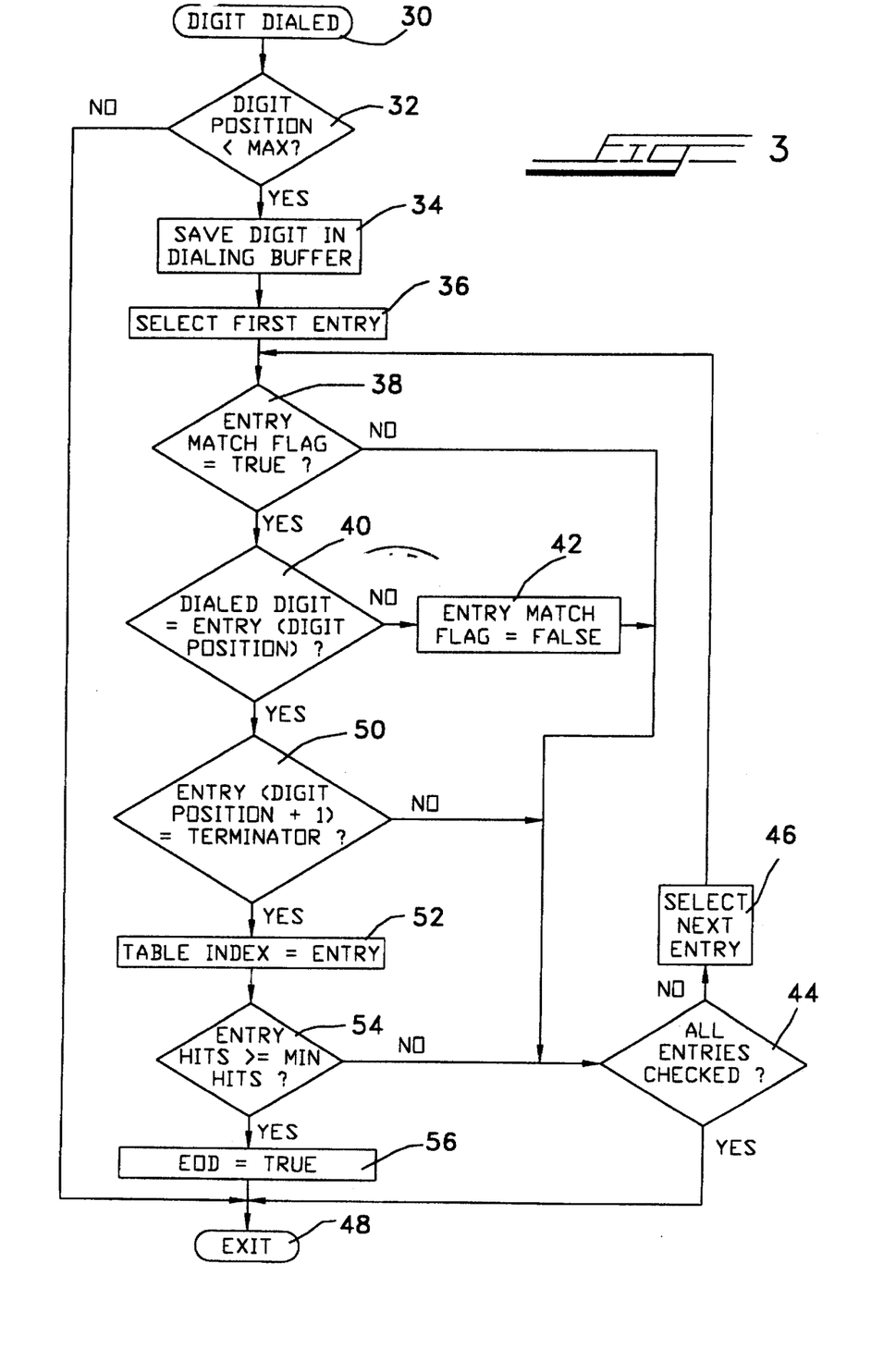
FIG. 3 is a flow chart showing the actual matching process of a presently-dialed telephone number with a stored list of the previously-dialed telephone numbers.

Referring now to FIG. 3, the actual, "Dialed Digit Matching" subroutine 30 is shown. In decision block 32, the dialed digit position is first examined to see if it is greater than the maximum allowed. For example, if the currently-dialed telephone number is greater than 16 digits, then upon the entry of a 17th digit ("NO" of decision block 32), then the subroutine exits (block 34), and the matching process for the currently-dialed telephone number is terminated, with the one of the other EOD methods being then employed to generate the SEND command, such as the time-out method. If the dialed digit is in a location that is less than the maximum allowed ("YES" of decision block 32), then that currently-dialed digit of the currently-dialed telephone number is stored in the dialing buffer area of RAM (block 34). After each digit of the currently-dialed telephone number has been stored in the dialing buffer of RAM, then that digit and its value is checked against the list of previously-dialed telephone numbers to see if there is a match (block 36). If the digit is the first one dialed, then all of the previously-dialed telephone number entries in the table are searched and compared; that is, for first dialed digit, all of the entries of the table have been initially set to have a match-flag of "TRUE". Thus, for the first digit entry, the answer to decision block 38 will be "YES" for each entry of the table. In block 40, the dialed digit is compared to the corresponding digit of each table-entry. For the first dialed digit, all table-entries will be searched; for subsequent dialed digits, only those entries for which the "Match Flag" has been set to "TRUE" will be searched. If the entry is not found to match, then the answer to block 40 is "NO", the matchflag for that entry is set at "FALSE" (block 42), and then the subroutine checks to see if all of the entries have been checked (block 44), and if "NO", then the next entry is selected (block 46), and the process repeated. If the answer to decision block 44 is "YES", meaning that all of the entries have been compared, then the subroutine exits (block 48), and returns to decision block 32 and awaits the entry of the next dialed digit, whereupon decision block 32 will again determine if its location is less than the maximum allowed, and if "YES", then blocks 34-40 are repeated for each dialed digit. If the answer to decision block 40 is "YES", which means a match has been found between the dialed digit and the corresponding digit in the table-entry, then the subroutine checks to see if the next digit position of the table-entry is the terminator symbol, such as "#", or the like (decision block 50). If "YES", then this indicates that the dialed telephone number is the same as the table-entry just checked (block 52). If the answer to decision block 50 is "NO", then the subroutine advances to decision block 44 to see if all of the entries have been compared. If all have been checked, then the subroutine exits (block 48), and returns to decision block 32 to await entry of the next dialed digit of the currently-dialed telephone number. If not all of the entries have been checked, then the subroutine returns to decision block 38 to check the next table-entry.

If the answer to decision block 50 is "YES", the subroutine has determined that the currently-dialed telephone number matches one of the entries. The program then sets "Table Index" to the matching entry (block 52), then the program determines how many times that table-entry has been successfully dialed out; that is, in decision block 54, the subroutine determines if the minimum number of times dialed (MIN-HITS) is at least equal to some minimum of prior, successfully-completed calls for that table entry, which is preferably equal to or greater than 2. If "YES", then the EOD flag is set as "TRUE" (block 56), and the "SEND" command is caused to be generated. If the answer to decision block 54 is "NO", meaning that the table-entry has only been successfully called once, if T=2, then the subroutine will disregard this table-entry and advance to decision block 44 to again see if all table-entries have been compared. Since, for all intents and purposes, there has been a complete match to a table-entry, but that the value of T has not yet been reached, the subroutine will advance to exit immediately (block 48), and the currently-dialed telephone number will have its "SEND" command generated by one of the prior-art methods, such as the time-out method.

Figure 4:
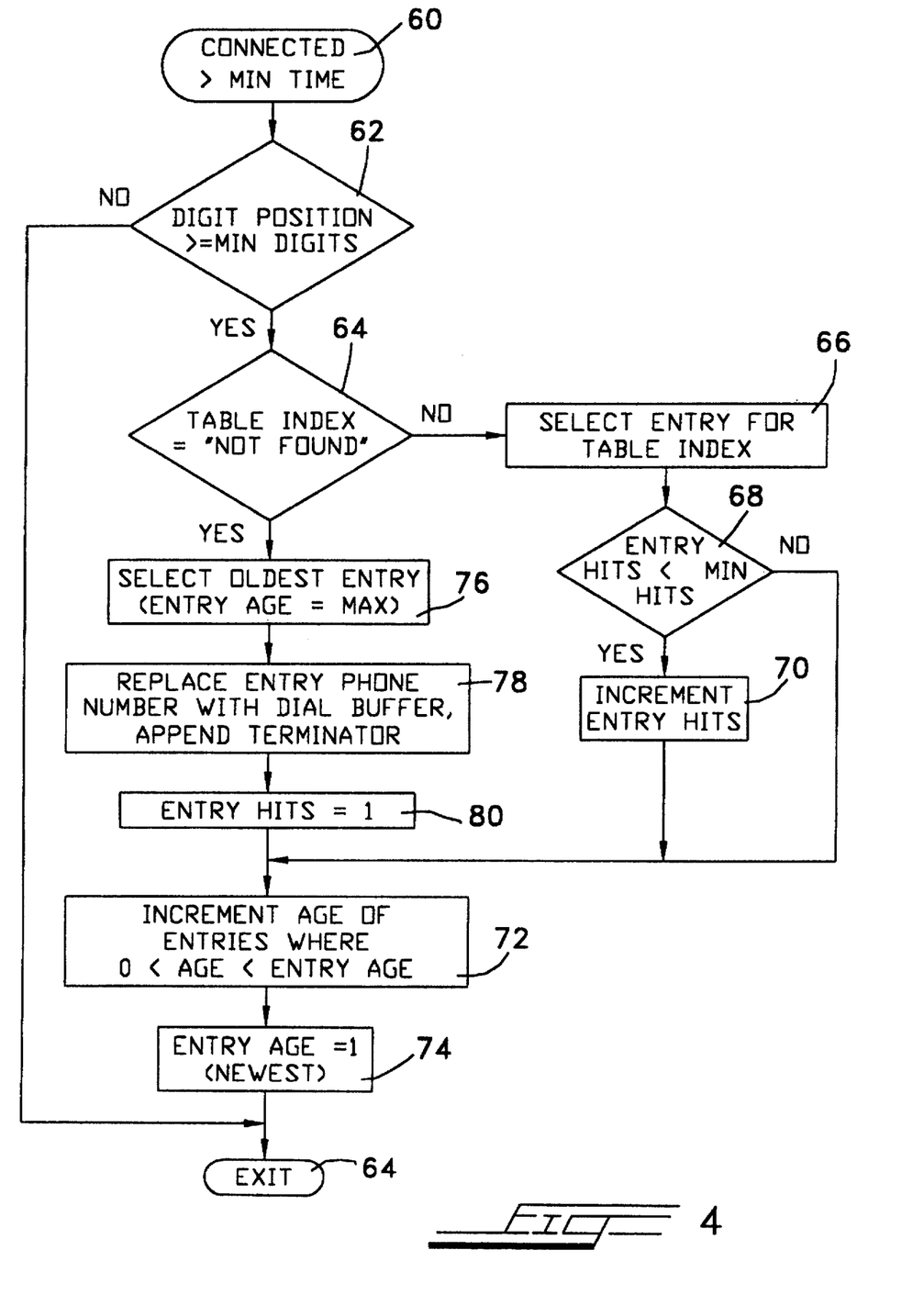
FIG. 4 a flow chart showing the sequence of events for determining the storage and deletion of a previously-dialed telephone number.

Referring now to FIG. 4, there is shown the subroutine for determining whether a currently-dialed telephone number should be newly added to the table of previously-dialed telephone numbers, as well as other updating functions therefor. The subroutine in FIG. 4 first determines how long the currently-dialed telephone number was connected (block 60). If less than the minimum time, such as 15 seconds, then the call is assumed to have no importance. If the call was connected for more than some minimum time, then the subroutine begins. The subroutine in FIG. 4 first ensures that the currently-dialed telephone number has at least a required amount of digits (decision block 62), in order to prevent the storage of misdialed numbers in the storage table. If "NO", then the subroutine exits (block 64). If "YES", then the subroutine continues to determine if the currently-dialed telephone number has found a match in the table of entries of previously-dialed telephone numbers (block 64). If "NO", indicating the currently-dialed telephone number has found a match with a previously-dialed telephone number in the table of entries, then the currently-dialed telephone number is selected for entry in order to update the table (block 66). Decision block 68 then determines how many times the previously-dialed telephone numbers matched to this currently-dialed telephone number has been successfully dialed out, or the number of "hits". If the number of "hits" is greater than the minimum amount (greater than T, where T is preferably equal to or greater than 2), then the answer to decision block is "NO", and the subroutine advances. If the answer to decision block 68 is "YES", then the subroutine will increment the number of successfully completed calls, or hits, in RAM for that entry (block 70). In either a "YES" or "NO" to decision block 68, the subroutine advances to block 72, where the age of all entries are incremented, such that each entry, besides the current entry, will have its time stamp updated or incremented by one to a greater value, for all those previously-dialed telephone numbers in the table whose time stamps were more recent than the previous time stamp of the matched previously-dialed telephone number. The currently-dialed telephone number, which is the matched previously-dialed telephone number, will now have its time stamp updated and set to zero (block 74), indicating that this entry is the most recent entry.

If the answer to decision block 64 is "YES", indicating that it is the currently-dialed telephone number that has found no match in the table of entries, then the table of entries must be updated by replacing the oldest previously-dialed telephone number with the newest, currently-dialed telephone number (blocks 76 and 78). The value of the number of "hits" for this newest entry is set at 1, since it is the first time this currently-dialed telephone number has been successfully dialed out (block 80).

The following is the software listing for performing the above-detailed flow charts. It is noted that this software will operate on a table whose entries have been stored using a non-ordered method.

```
///////////////////////////////////////////////////////////////////////////////////////////////////////////////
//
// file    : enddial.c
// purpose : originate call without delay for frequently dialed numbers
//
// copyright (c) 1997 Telular Corporation, Inc.
//
///////////////////////////////////////////////////////////////////////////////////////////////////////////////
#include "rtx51.h"
#include "Std_def.h"
#include "mail_box.h"
#include "utils.h"
#include "eeprom.h"
#define MAX_DIAL_ENTRIES 50
#define MIN_HITS 2
#define TERMINATOR '#'
#define NOT_FOUND 255
#define PHONE_NUM_LENGTH 17
#define MIN_DIGITS 3
void ResetDialing (void);
void CheckDialDigit (BYTE digit);
void NumberValid (void);
void SetNewest (void);
void ReplaceOldest (void);
typedef struct {
    BYTE match;
    BYTE age;
    BYTE hits;
    BYTE PhoneNumber[PHONE_NUM_LENGTH];
    } DialEntry ;
static DialEntry DialTbl[MAX_DIAL_ENTRIES];
static BYTE DigitPosition);
static BYTE DialIndex;
static BYTE DialBuffer[PHONE_NUM_LENGTH];
// called at power-up
// initializes DialTbl
void InitEod (void)
{
    BYTE i,j;
    for (i=0; i<MAX_DIAL_ENTRIES ; ++i) {
        DialTbl[i].age = MAX_DIAL_ENTRIES;
        DialTbl[i].hits = 0;
        for(j=0 ; j<PHONE_NUM_LENGTH ; ++j)
            DialTbl[i].PhoneNumber[j] = 0;
    }
}
// called at start of dial tone
// initializes EOD variables for new dialing sequence
void ResetDialing (void)
{
    BYTE i;
    DigitPosition = 0;
    DialIndex = NOT_FOUND
    for (i=0; i<MAX_DIAL_ENTRIES ; ++i)
        DialTbl[i].match = TRUE;
    for (i=0 ; i<PHONE_NUM_LENGTH ; ++i)
        DialBuffer[i] = 0;
}
// called from MMI task for each digit dialed, if first character dialed is not Terminator
// originates call if valid match found in DialTbl
void EndOfDialing (BYTE digit)
{
```

-continued

```
    BYTE i;
    if(DigitPosition>PHONE_NUM_LENGTH-1)
        return;
    // originate call if valid match found in DialTbl
    DialBuffer[DigitPosition] = digit;                              // save digit in buffer
    for (i=0 ; i<MAX_DIAL_ENTRIES ; ++i){                           // look through entire table
        if(DialTbl[i].match){                                       //skip entries that have already mismatched
            if (DialTbl[i].PhoneNumber[DigitPosition] == digit)(                 // if digit matches and
                if(DialTbl[i].PhoneNumber[DigitPosition. + 1] == TERMINATOR){    // is last digit in entry
                    DialIndex = i;                                               // save entry index
                    if(DialTbl[i].hits >= MIN_HITS)                              // if entry hits > MIN_HITS
                        EODial = TRUE;                                           // originate call
                    break;
                }
            }
            else
                DialTbl[i].match = FALSE;        // clear flag if mismatch
        }
    }
    ++DigitPosition;
}
// called from MMI task when connected > 15 seconds
// replace oldest entry in DialTbl if dialed number is not in DialTbl
// increment entry hits if in table and make it the newest entry
void NumberValid (void)
{
    if(DigitPosition >= MIN_DIGITS) {
        if (DialIndex == NOT_FOUND)
            ReplaceOldest( );
        else {
            if (DialTbl[DialIndex].hits < MIN_HITS)
                ++DialTbl[DialIndex].hits;
            SetNewest( );
        }
    }
}
// increment age of entries that are newer than DialTbl[DialIndex]
// set age of DialTbl[DialIndex] to newest (0)
void SetNewest (void)
{
    BYTE i,
    for (i=0 ; i<MAX_DIAL_ENTRIES ; ++i){
        if (DialTbl[i].age < DialTbl[DialIndex].age)
            ++DialTbl[i].age;
    }
    DialTbl[DialIndex].age = 0;
}
// replace oldest entry (maximum age) in DialTbl with number in DialBuffer
// and make it the newest entry
void ReplaceOldest (void)
{
    BYTE i, OldestAge;
    OldestAge = 0;
    DialIndex = 0;
    for (i=0 ; i<MAX_DIAL_ENTRIES ; ++i){
        if (DialTbl[i].age > OldestAge) {
            OldestAge = DialTbl[i].age;
            DialIndex = i;
        }
    }
    DialTbl[DialIndex].hits = 1;
    for (i=0 ; (i<PHONE_NUM_LENGTH) && DialBuffer[i]; ++i)
        DialTbl[DialIndex].PhoneNumber[i] = DialBuffer[i];
    DialTbl[DialIndex].PhoneNumber[i] = TERMINATOR;
    SetNewest( );
}
```

While the radio network and interface discussed hereinabove have been those for the cellular network, other radio network systems may also readily employ the system of the invention. The types of cellular-like systems, besides the pure-type of cellular systems, in which the present invention may be used, are those that relate generally to a wireless digital personal communications systems having a plurality of intelligent base stations and intelligent, remote handset terminals, each having a predetermined radio cell coverage area, and more particularly to a digital, radio cell, radio-telephone, personal communications system (or PCS) having a full ISDN interface, thereby facilitating direct interconnection and switching of PCS call traffic through the ISDN interface and the public switched telephone network, or any switched network, the personal communications system having voice/data/image (or any combination thereof) and two-way full-duplex incoming and outgoing calling capability, and being fully operational and compatible with any modulation approach selected, with the intercell protocol hand-off being provided through distributed logic which is implemented in software that is resident in the intelligent, remote handset terminals, the intelligent base stations, and the public switched telephone network (or any switched network) equipped with a PCS service control data base.

While specific embodiments of the invention have been shown and described, it is to be understood that numerous changes and modifications may be made therein without departing from the scope, spirit and intent of the invention as set forth in the appended claims.

What we claim is:

1. In a radio interface apparatus coupling a land-type telephone instrument to a radio transceiver for coupling the telephone instrument to a radio network, said interface comprising a microprocessor and memory means, a method of automatically determining the generation of a send-signal to the transceiver upon the detection of the end-of-dialing of a telephone number entered into the telephone instrument, said method comprising:

(a) storing a list of telephone numbers that have been previously-dialed telephone numbers on the telephone instrument coupled to the radio interface apparatus;

(b) comparing a currently-dialed telephone number entered by the telephone instrument to the list of previously-dialed telephone numbers;

(c) determining if the currently-dialed telephone number matches one of the previously-dialed telephone numbers of the list of previously-dialed telephone numbers;

(d) determining an end-of-dialing detection method to utilize; and (e) generating a send-signal command in response to said step (d) to the transceiver for transmission over the radio network;

said step (b) comprising comparing the first dialed digit of the currently-dialed telephone number with all of the first digits of the previously-dialed telephone numbers of the list of previously-dialed telephone numbers.

2. The method according to claim 1, wherein said step (c) comprises:

(f) determining, for a matched currently-dialed telephone number, if the matched, previously-dialed telephone number has been previously, successfully completed at least a predetermined minimum amount.

3. The method according to claim 2, wherein said step (f) further comprises, if the matched, previously-dialed telephone number has been previously, successfully completed at least a predetermined minimum amount of times, immediately thereafter performing said step (e) in response to said step (c); said step of determining that the matched, previously-dialed telephone number has been previously, successfully completed at least a predetermined minimum amount constituting said step (d).

4. The method according to claim 3 wherein said step (e) further comprises, if the matched, previously-dialed telephone number has not been previously, successfully completed at least a predetermined minimum amount:

performing said step (d) and generating the send-signal command to the transceiver by another, end-of-dialing determination method; and (f) adding the currently-dialed telephone number to the list of previously-dialed telephone numbers if the currently-dialed telephone number has been successfully completed.

5. The method according to claim 1, wherein said step (d) comprises one of the following:

determining end-of-dialing by a match of the currently-dialed telephone number with a previously-dialed telephone number of the list of stored previously-dialed telephone numbers for that matched previously-dialed telephone number that has been successfully completed a predetermined minimum amount;

time-out method; and manual entry of end-of-dialing by the user of the telephone instrument.

6. The method according to claim 2, wherein if the matched, previously-dialed telephone number has not been previously, successfully completed at least a predetermined minimum amount, immediately after performing said steps (d) and (e);

updating, in the list of previously-dialed telephone numbers, the number of successfully completed connections of the matched telephone number.

7. The method according to claim 1, wherein said step (a) comprises updating the list of previously-dialed telephone numbers with the currently-dialed telephone number after the currently-dialed telephone number has been successfully-connected to the radio network.

8. The method according to claim 7, wherein said step of updating comprises dropping the oldest previously-dialed telephone number from the list of previously-dialed telephone numbers, and adding the currently-dialed telephone number to the list of previously-dialed telephone numbers if successfully connected; said step of dropping being carried out when the memory-storage area for the list of previously-dialed telephone numbers has reached capacity.

9. The method according to claim 1, wherein said step (b) comprises comparing each dialed digit of the currently-dialed telephone number with at least some of the corresponding digits of the previously-dialed telephone numbers.

10. The method according to claim 1, wherein said step (b) comprises comparing each subsequently dialed digit of the currently-dialed telephone number with the corresponding digits of those previously-dialed telephone numbers of the list of previously-dialed telephone numbers for which a match was found during the performance of said step (b) for the previous digit entered of the currently-dialed telephone number.

11. A method of automatically determining the generation of a send-signal to a radio transceiver upon the detection of the end-of-dialing of a telephone number entered into the telephone instrument connected to a radio interface coupling a land-type telephone instrument to a radio transceiver for coupling the telephone instrument to a radio network, the interface comprising a microprocessor and memory means, comprising:

(a) comparing a currently-dialed telephone number entered by the telephone instrument to a list of previously-dialed telephone numbers;

(b) determining that the currently-dialed telephone number matches one of the previously-dialed telephone numbers of the list of previously-dialed telephone numbers;

(c) generating a send-signal command in response to said step (b) to the transceiver for transmission over the radio network;

said step (a) comprising comparing the first dialed digit of the currently-dialed telephone number with the first digit of at least one previously-dialed telephone number of the list of previously-dialed telephone numbers.

12. The method according to claim 11, further comprising:

(d) updating, in the list of previously-dialed telephone numbers, the number of successfully completed connections of the matched currently-dialed and previously-dialed telephone number.

13. The method according to claim 11, further comprising:
(d) determining that the currently-dialed telephone number is not a match with any of the previously-dialed telephone numbers of the list of previously-dialed telephone numbers; and
(e) generating a send-signal command in response to said step (d) to the transceiver for transmission over the radio network.

14. The method according to claim 13, further comprising:
(f) updating the list of previously-dialed telephone numbers with the currently-dialed telephone number after the currently-dialed telephone number has been successfully-connected to the radio network.

15. The method according to claim 14, wherein said step (f) comprises:
(g) dropping the oldest previously-dialed telephone number from the list of previously-dialed telephone numbers, and adding the currently-dialed telephone number to the list of previously-dialed telephone numbers if successfully connected; said step of dropping being carried out when the memory-storage area for the list of previously-dialed telephone numbers has reached capacity.

16. The method according to claim 11, wherein said step (a) further comprises comparing each subsequently dialed digit of the currently-dialed telephone number with the corresponding digits of the those previously-dialed telephone numbers of the list of previously-dialed telephone numbers for which a match was found during the performance of said step (b) for the previous digit entered of the currently-dialed telephone number.

17. In a radio interface apparatus coupling a land-type telephone instrument to a radio transceiver for coupling the telephone instrument to a radio network, said interface comprising a microprocessor, and means for automatically determining the generation of a send-signal and transmitting a send-signal command to the radio transceiver upon the detection of the end-of-dialing of a telephone number entered into the telephone instrument, the improvement comprising:
said means for automatically determining the generation of a send-signal to the radio transceiver upon the detection of the end-of-dialing of a telephone number entered into the telephone instrument comprising a first memory portion operatively associated with said microprocessor for storing a list of telephone numbers that have been previously-dialed telephone numbers on a telephone instrument coupled to the radio interface apparatus;
a second memory portion operatively associated with said microprocessor, and a comparing means stored in said second memory portion for comparing a currently-dialed telephone number entered by the telephone instrument coupled to the radio interface apparatus to the list of previously-dialed telephone numbers stored in said first memory portion for determining that the currently-dialed telephone number matches one of the previously-dialed telephone numbers of the list of previously-dialed telephone numbers stored in said first memory portion; and
a third memory portion operatively associated with said microprocessor for generating a send-signal command to the radio receiver; said third memory portion generating a send-signal command in response to said comparing means finding a match between the currently-dialed telephone number and a previously-dialed telephone number of said list of previously-dialed telephone numbers stored in said first memory portion.

18. In a radio interface apparatus coupling a land-type telephone instrument to a radio transceiver for coupling the telephone instrument to a radio network, said interface comprising a microprocessor, memory means associated with said microprocessor, means for determining the end-of-dialing of a currently-dialed telephone number entered into the telephone instrument, and means for automatically generating a send-signal command to the radio transceiver upon the detection of the end-of-dialing of a telephone number entered into the telephone instrument, the improvement comprising:
said means for determining the end-of-dialing of a currently-dialed telephone number entered into said telephone instrument comprising a first portion of said memory means for storing a list of telephone numbers that have been previously-dialed telephone numbers on the telephone instrument coupled to the radio interface apparatus;
a second portion of said memory means and a comparison means stored in said second portion for comparing a currently-dialed telephone number entered by the telephone instrument coupled to the radio interface apparatus to the list of previously-dialed telephone numbers stored in said first portion of said memory means for determining that the currently-dialed telephone number matches one of the previously-dialed telephone numbers of the list of previously-dialed telephone numbers stored in said first portion of said memory means; and
said means for automatically generating a send-signal command to the radio transceiver generating the send-signal command in response to said comparison means of said second memory portion finding a match between the currently-dialed telephone number and a previously-dialed telephone number of said list of previously-dialed telephone numbers stored in said first portion of said memory means.

19. The radio interface apparatus according to claim 18, in combination with a cellular-radio transceiver, and a land-type telephone instrument means said telephone instrument means and said transceiver being operatively coupled to said radio interface apparatus.

20. The radio interface apparatus according to claim 18, further comprising additional means for determining the end-of-dialing of a currently-dialed telephone number entered into said telephone instrument, said additional means for determining the end-of-dialing of a currently-dialed telephone number entered into said telephone instrument comprising at least one of: an automatic time-out means; and a manual-entry means of end-of-dialing by the user of the telephone instrument.

21. The radio interface apparatus according to claim 18, further comprising additional means for determining the end-of-dialing of a currently-dialed telephone number entered into said telephone instrument; said additional means for determining being used to actuate said means for automatically generating a send-signal command to the radio transceiver when said comparison means of said second portion of said memory means fails to find a match between said currently-dialed telephone number and said list of previously-dialed telephone numbers stored in said first portion of said memory means.

22. The radio interface apparatus according to claim 18, wherein said means for determining the end-of-dialing of a currently-dialed telephone number entered into said telephone instrument further comprises updating means stored in said memory means for updating said list of previously-dialed telephone numbers stored in said first portion of said memory means.

23. The radio interface apparatus according to claim 22, wherein updating means comprises means for erasing the oldest previously-dialed telephone number of said list of previously-dialed telephone numbers and adding the currently-dialed telephone number to said list.

24. In a radio interface apparatus coupling a land-type telephone instrument to a radio transceiver for coupling the telephone instrument to a radio network, said interface comprising a microprocessor and memory means, a method of automatically determining the generation of a send-signal to the transceiver upon the detection of the end-of-dialing of a telephone number entered into the telephone instrument, said method comprising:
  (a) storing a list of telephone numbers that have been previously-dialed telephone numbers on the telephone instrument coupled to the radio interface apparatus;
  (b) comparing a currently-dialed telephone number entered by the telephone instrument to the list of previously-dialed telephone numbers;
  (c) determining if the currently-dialed telephone number matches one of the previously-dialed telephone numbers of the list of previously-dialed telephone numbers;
  (d) determining an end-of-dialing detection method to utilize; and
  (e) generating a send-signal command in response to said step (d) to the transceiver for transmission over the radio network;
  said step (c) comprising:
    (f) determining, for a matched currently-dialed telephone number, if the matched, previously-dialed telephone number has been previously, successfully completed at least a predetermined minimum amount;
    said step (f) further comprising, if the matched, previously-dialed telephone number has been previously, successfully completed at least a predetermined minimum amount of times, immediately thereafter performing said step (e) in response to said step (c); said step of determining that the matched, previously-dialed telephone number has been previously, successfully completed at least a predetermined minimum amount constituting said step (d); and
    said step (e) further comprising, if the matched, previously-dialed telephone number has not been previously, successfully completed at least a predetermined minimum amount: performing said step (d) and generating the send-signal command to the transceiver by another, end-of-dialing determination method; and adding the currently-dialed telephone number to the list of previously-dialed telephone numbers if the currently-dialed telephone number has been successfully completed.

25. In a radio interface apparatus coupling a land-type telephone instrument to a radio transceiver for coupling the telephone instrument to a radio network, said interface comprising a microprocessor and memory means, a method of automatically determining the generation of a send-signal to the transceiver upon the detection of the end-of-dialing of a telephone number entered into the telephone instrument, said method comprising:
  (a) storing a list of telephone numbers that have been previously-dialed telephone numbers on the telephone instrument coupled to the radio interface apparatus;
  (b) comparing a currently-dialed telephone number entered by the telephone instrument to the list of previously-dialed telephone numbers;
  (c) determining if the currently-dialed telephone number matches one of the previously-dialed telephone numbers of the list of previously-dialed telephone numbers;
  (d) determining an end-of-dialing detection method to utilize; and
  (e) generating a send-signal command in response to said step (d) to the transceiver for transmission over the radio network;
  said step (c) comprising:
    (f) determining, for a matched currently-dialed telephone number, if the matched, previously-dialed telephone number has been previously, successfully completed at least a predetermined minimum amount;
    wherein if the matched, previously-dialed telephone number has not been previously, successfully completed at least a predetermined minimum amount, immediately after performing said steps (d) and (e), updating, in the list of previously-dialed telephone numbers, the number of successfully completed connections of the matched telephone number.

26. In a radio interface apparatus coupling a land-type telephone instrument to a radio transceiver for coupling the telephone instrument to a radio network, said interface comprising a microprocessor and memory means, a method of automatically determining the generation of a send-signal to the transceiver upon the detection of the end-of-dialing of a telephone number entered into the telephone instrument, said method comprising:
  (a) storing a list of telephone numbers that have been previously-dialed telephone numbers on the telephone instrument coupled to the radio interface apparatus;
  (b) comparing a currently-dialed telephone number entered by the telephone instrument to the list of previously-dialed telephone numbers;
  (c) determining if the currently-dialed telephone number matches one of the previously-dialed telephone numbers of the list of previously-dialed telephone numbers;
  (d) determining an end-of-dialing detection method to utilize; and
  (e) generating a send-signal command in response to said step (d) to the transceiver for transmission over the radio network;
  said step (a) comprising updating the list of previously-dialed telephone numbers with the currently-dialed telephone number after the currently-dialed telephone number has been successfully-connected to the radio network.

27. A method of automatically determining the generation of a send-signal to a radio transceiver upon the detection of the end-of-dialing of a telephone number entered into the telephone instrument connected to a radio interface coupling a land-type telephone instrument to a radio transceiver for coupling the telephone instrument to a radio network, the interface comprising a microprocessor and memory means, comprising:

(a) comparing a currently-dialed telephone number entered by the telephone instrument to a list of previously-dialed telephone numbers;

(b) determining that the currently-dialed telephone number matches one of the previously-dialed telephone numbers of the list of previously-dialed telephone numbers;

(c) generating a send-signal command in response to said step (b) to the transceiver for transmission over the radio network; and (d) updating, in the list of previously-dialed telephone numbers, the number of successfully completed connections of the matched currently-dialed and previously-dialed telephone number.

28. A method of automatically determining the generation of a send-signal to a radio transceiver upon the detection of the end-of-dialing of a telephone number entered into the telephone instrument connected to a radio interface coupling a land-type telephone instrument to a radio transceiver for coupling the telephone instrument to a radio network, the interface comprising a microprocessor and memory means, comprising:

(a) comparing a currently-dialed telephone number entered by the telephone instrument to a list of previously-dialed telephone numbers;

(b) determining that the currently-dialed telephone number matches one of the previously-dialed telephone numbers of the list of previously-dialed telephone numbers;

(c) generating a send-signal command in response to said step (b) to the transceiver for transmission over the radio network;

(d) determining that the currently-dialed telephone number is not a match with any of the previously-dialed telephone numbers of the list of previously-dialed telephone numbers;

(e) generating a send-signal command in response to said step (d) to the transceiver for transmission over the radio network; and (f) updating the list of previously-dialed telephone numbers with the currently-dialed telephone number after the currently-dialed telephone number has been successfully-connected to the radio network.

* * * * *